United States Patent
Andersson et al.

(10) Patent No.: US 7,341,202 B2
(45) Date of Patent: *Mar. 11, 2008

(54) METHOD AND DEVICE FOR PRODUCING A COHERENT LAYER OF EVEN THICKNESS OF LIQUID OR MELT ON A ROTATING DISK

(75) Inventors: Ralf Goran Andersson, Helsingborg (SE); Ingemar Jonsson, Helsingborg (SE)

(73) Assignee: GE Healthcare Bio-Sciences AB, Uppsala (SE)

(*) Notice: Subject to any disclaimer, the term of this patent is extended or adjusted under 35 U.S.C. 154(b) by 280 days.

This patent is subject to a terminal disclaimer.

(21) Appl. No.: 11/013,065

(22) Filed: Dec. 15, 2004

(65) Prior Publication Data

US 2005/0112280 A1 May 26, 2005

Related U.S. Application Data

(63) Continuation of application No. 10/148,719, filed as application No. PCT/SE00/02357 on Nov. 29, 2000, now Pat. No. 6,843,427.

(30) Foreign Application Priority Data

| Dec. 1, 1999 | (SE) | ..................................... 9904345 |
| Nov. 29, 2000 | (SE) | ....................... PCT/SE00/02357 |

(51) Int. Cl.
*B05B 3/02* (2006.01)

(52) U.S. Cl. .................... 239/7; 239/222.11; 239/223; 239/224; 239/554; 239/555

(58) Field of Classification Search .................... 239/7, 239/214, 222.11, 223, 224, 500, 554, 555, 239/103, 104, 120, 121; 264/5, 8; 425/6, 425/8; 118/320, 321, 323

See application file for complete search history.

(56) References Cited

U.S. PATENT DOCUMENTS

| 1,266,501 A | | 5/1918 | Leitch |
| 1,506,226 A | | 8/1924 | Dick |
| 1,870,099 A | | 8/1932 | Croan |
| 1,994,239 A | * | 3/1935 | Herman ...................... 239/214 |
| 2,515,665 A | | 7/1950 | Pieper |
| 3,103,311 A | | 9/1963 | Kempf |
| 4,225,084 A | * | 9/1980 | Bals ........................... 239/223 |
| 4,530,462 A | | 7/1985 | Andersson |
| 4,733,821 A | | 3/1988 | Jensen et al. |
| 4,978,069 A | | 12/1990 | Andersson et al. |
| 5,452,853 A | * | 9/1995 | Shook et al. .................. 239/7 |
| 6,063,190 A | * | 5/2000 | Hasebe et al. .............. 118/320 |
| 6,634,568 B1 | * | 10/2003 | Andersson et al. ............. 239/7 |

FOREIGN PATENT DOCUMENTS

| WO | WO 88/07414 | 10/1988 |
| WO | WO 00/18529 | 4/2000 |

* cited by examiner

*Primary Examiner*—Steven J. Ganey
(74) *Attorney, Agent, or Firm*—Dwayne L. Bentley

(57) ABSTRACT

Method and device for continuously producing a coherent layer of a liquid/melt of even thickness by means of centrifugal action along the entire periphery of a rotating disk (13, 113), liquid/melt being supplied to the disk around its entire axis of rotation from means (12, 112) and leaving the disk as individual droplets. The means (12, 112) distributing the liquid/melt onto the disk (13, 113) has according to the invention essentially the same speed and direction of rotation as the disk, and the liquid/melt undergoes under the influence of centrifugal action circumferentially a spreading and change in velocity across the disk (13, 113) in contact with the same.

7 Claims, 2 Drawing Sheets

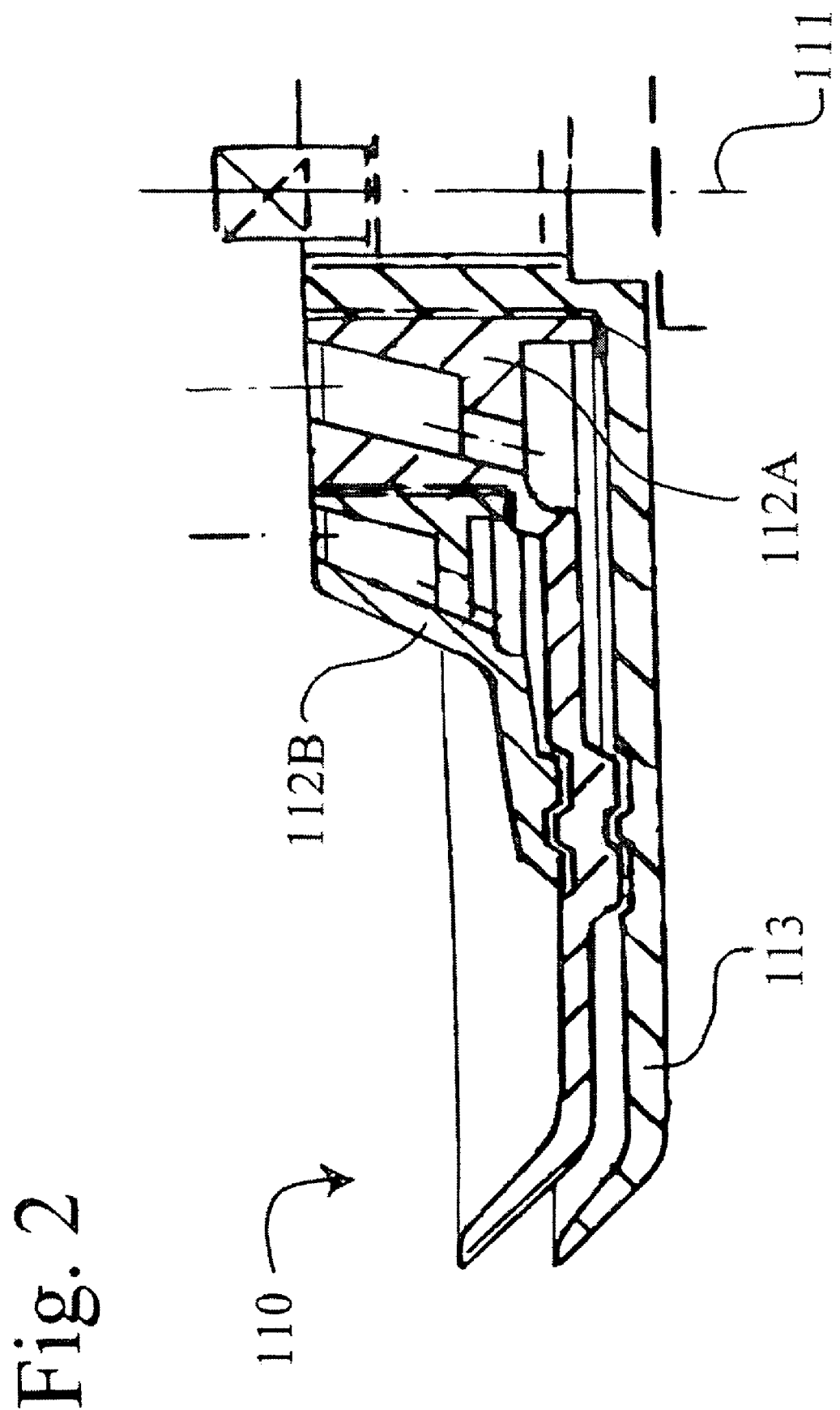

METHOD AND DEVICE FOR PRODUCING A COHERENT LAYER OF EVEN THICKNESS OF LIQUID OR MELT ON A ROTATING DISK

CROSS REFERENCE TO RELATED APPLICATIONS

This application is a continuation of U.S. patent application Ser No. 10/148,719 filed Aug. 21, 2002, now U.S. Pat. No. 6,843,427, which was a filing under 35 U.S.C. § 371 and claimed priority to international patent application number PCT/SE00/02357 filed Nov. 29, 2000, published on Jun. 7, 2001, as WO 01/39890 and claims priority to patent application number 9904345-7 filed in Sweden on Dec. 1, 1999; the disclosures of which are incorporated herein by reference in their entireies.

BACKGROUND OF INVENTION

The present invention refers to a method for continuously producing a coherent layer of a liquid/melt of even thickness by means of centrifugal action along the entire periphery of a rotating disk, the liquid/melt leaving the disk as individual droplets. The invention also refers to a device for accomplishing the method.

Liquid material can mechanically be finely divided into droplets (particles) in several ways. Recently, centrifugal techniques have been used for the purpose of achieving a smallest possible variation in diameter and of increasing the production capacity when droplets are formed. Originally, these types of device for droplet formation used a perforated wall in a rotating centrifuge in order to generate the actual droplets. A further development of this method has been to let the manufacturing of particles take place from a rotating disk by means of a centrifugal technique. An example of this is the production of spherical particles, where droplets of liquid material by means of centrifugal action are thrown out from the disk and in a subsequent solidifying process are brought to solidify into particles.

In W08807414 a droplet formation method and apparatus is shown, a liquid being distributed onto disks. A distributing means is adapted to distribute the liquid uniformly and circumferentially on the disks. This distributing means comprises a dosing container which is rotationally independent of the disks and from which the liquid is dosed though one or several dosing openings onto the disks. The liquid then spreads radially outwards towards cusps and is divided into particles.

However, the diameter of the particles produced in such a way varies to a different extent, and it has thus been most desirable to be able to produce particles with a smallest possible variation in diameter. In EP-A-0 368 851 attempts have been made to solve this problem by providing the device with a rotating inner distribution means, from which the liquid/melt is supplied to the disk, and the droplets are formed from the outer periphery of the disk by means of centrifugal action. When different types of spraying are used it is likewise important that droplets of uniform size are produced.

SUMMARY OF INVENTION

One problem is to supply the disk with a liquid/melt in a reliable way. It is for example difficult to provide a precise liquid flow by means of delivering pumps.

Another problem with centrifugal techniques is that the droplets are spattered or released from the liquid material prematurely. This uncontrolled release of liquid from the disk results in that the droplets/particles formed are not completely round.

Still another problem is to obtain a layer of even thickness at the site of droplet formation at the periphery of the rapidly rotating disk.

Thus, in order to control the amount of droplet forming material per unit of time and at the same time achieve a smallest possible variation in diameter it is during the manufacturing process very important that the liquid material is supplied evenly and continuously. Such an even dosage is especially required when solidifying or gelling spherical particles are produced from a liquid material, for example a melt or a liquid containing suspended or dispersed particles by means of a rotating disk. An even and controlled supply of liquid or melt is required on the disk in order to obtain a smallest possible variation in diameter.

In this connection the term "melt" refers to all types of substances in liquid or semiliquid form which optionally contain suspended or dispersed particles and which can be caused to solidify for example by changing the temperature, by desiccation or by chemical reactions. The term "liquid" refers to all materials in liquid or semiliquid form which allow droplet formation in a device as described above. Thus, the term "liquid" shall specifically also be considered to comprise melts as defined above.

The feeding of liquid or melt mainly takes place according to two principles. In EP-A-0 109 224 the feeding takes place by means of fixed nozzles which spray the liquid directly onto a disk which is rotating at a high velocity and is provided with grooves at its peripheral edge. In the above mentioned EP-A-0 368 851 the feeding is accomplished by means of a rotating distribution means which uniformly distributes the liquid onto the disk having an angular velocity which differs from that of the distribution means. Therewith the outer disk rotates rapidly and the inner distribution means rotates slowly.

Both these principles result in a limitation in connection with the moment of dispensing, for example when one or more liquid/melt present on the rotating disk has a viscosity or other mixing properties different from the same liquid/melt at the moment of being fed to the disk. These differences depend on the shear forces as well as the changed temperature conditions which the liquid/melt is subjected to on the rotating disk. This results in that part of the liquid/melt fed to the disk is transported uncontrolled across the surface of the disk to be thrown out from the same as too large droplets or particles in comparison with that liquid/melt which has adjusted its rheology to the new conditions on the disk. The corresponding phenomenon also takes place with those liquids/melts which are fed to a disk in too large a quantity or when a liquid/melt is fed onto a disk whose surface has far too insufficient adhering properties with regard to the liquid/melt.

The purpose of the invention is to produce a method and a device for controlled droplet formation, the above-mentioned problems being avoided.

In order to achieve this purpose the invention has obtained the characterizing features of claims 1 and 4, respectively.

BRIEF DESCRIPTION OF THE DRAWINGS

In order to explain the invention in more detail illustrative embodiments thereof will be described below reference being made to the accompanying drawings in which FIG. 2 is a half sectional view of a second embodiment of the device for droplet formation according to the invention with double distribution means.

DETAILED DESCRIPTION OF INVENTION

Figure 1:
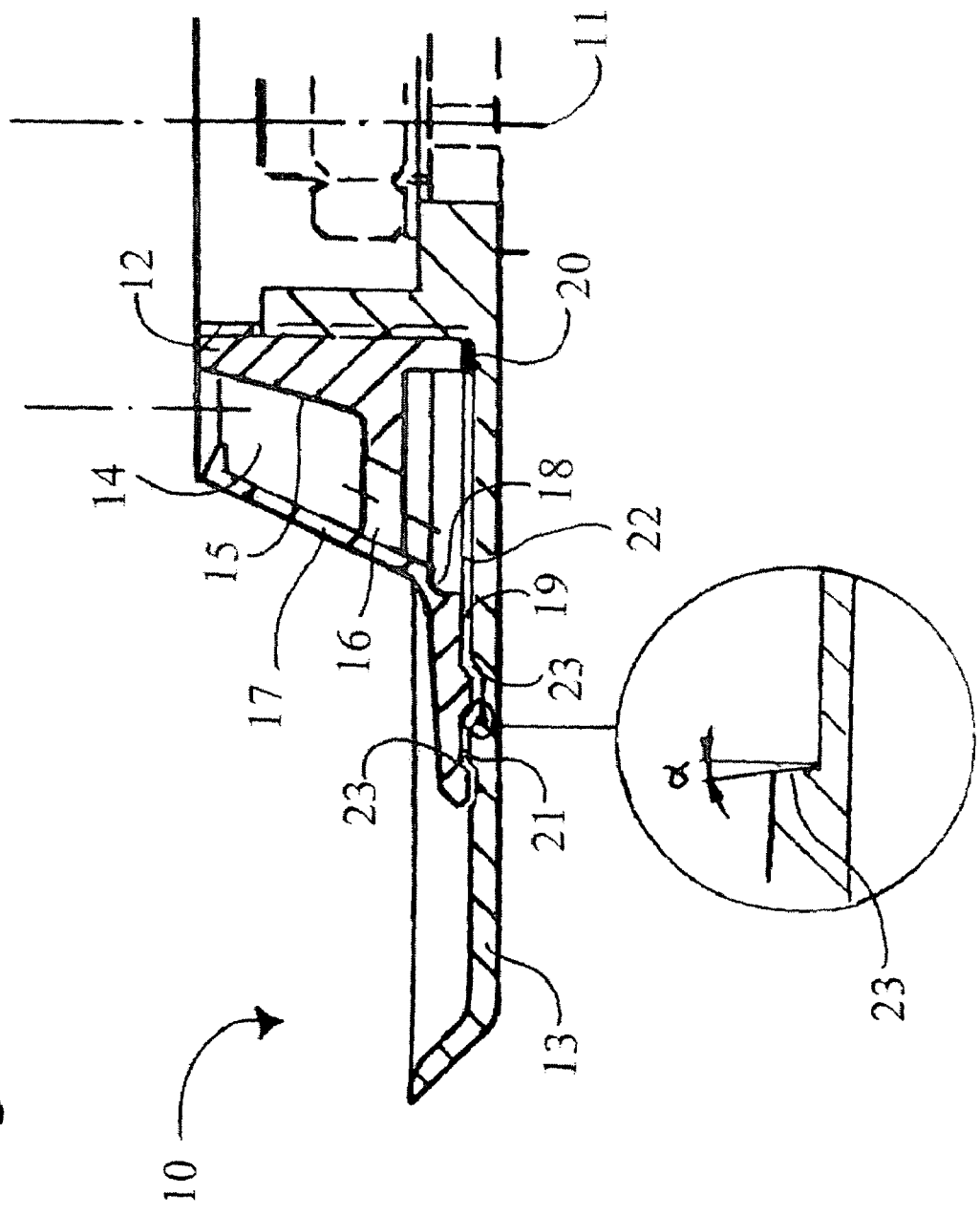
FIG. 1 is a half cross sectional view of a first embodiment of a device for droplet formation according to the invention with one distribution means, the figure including an enlargement of an edge.

FIG. 1 shows a device 10 for droplet formation or rotor which is attached to a geometrical axis 11. The device 10 for droplet formation comprises a distribution means 12 and a disk 13, the disk 13 first being perpendicularly screwed on the threaded axis 11 and the distribution means 12 in a corresponding way then being axially threaded on the disk 13.

In an upper part of the distribution means 12 a cavity 14 is provided around the entire axis, the cavity in that way obtaining a circumferential annular aperture upwards. The inner wall of the cavity is provided with a conical surface 15 which can be designed in different ways. Spokes 16 are also substantially vertically arranged on the inner wall at equal spacing from each other. These are radially connected with the outer wall 17 of the cavity, which extends downwards and out towards the disk. A notch 18 in the form of a rounded edge down towards the disk 13 is circumferentially provided below the spokes along the outside of the cavity.

The distribution means 12 and the disk 13 are circumferentially provided with a cocoperating notched deviation 21 in the form of a labyrinth which for example can be designed as opposite ring-shaped ridges and grooves in the underside of a lower projecting part of the distribution means 12 and the upper side of the disk 13 in such a way that when the distribution means and the disk are fastened a space 19 is formed between them. The size of this space is determined by means of a washer which is exchangeable and arranged below the distribution means 12 at the threaded part of the disk 13.

The edges 23 of the ring-shaped notched deviations, which are formed in the counter sinking, are not right angled but beveled with an angle α outwards the periphery of the disk as well as inwards the axis of the device for droplet formation. The purpose of the notch 18 is to achieve a film which is retained on the disk, the circumferential supply of material being completely even.

When exercising the method according to the invention the distribution means 12 of the device 10 for droplet formation is supplied in the cavity 14 with that liquid/melt which is used for the production of particles (droplets). The liquid/melt is homogenous with reference to its contents and is continuously supplied by means of for example one or several stationary nozzles (not shown) while the device for droplet formation is rotated. The speed of rotation depends on the size of the disk 13 as well as the properties of the material supplied and preferably amounts to less than 10000 rpm.

All surfaces which are supposed to come into contact with a liquid/melt are adapted to its properties in order to achieve an effective wetting by the liquid/melt. Thus, with for example a hydrophobic liquid/melt the contact surfaces of the device for droplet formation also are hydrophobic.

By means of the centrifugal force obtained during the rotation the liquid/melt is transported from the conical notch 15 towards the outer wall 17 of the cavity 14. The conical notch on the inner wall of the cavity promotes an increased velocity and stirring of the liquid/melt, which is important especially when the liquid/melt consists of different components with different rheological properties. By the outer wall 17 being angled outwards/downwards the liquid/melt is transported by means of the centrifugal force along the wall towards the disk 13 and past the spokes 16 which also can be aligned in such a way that the best possible adjustment of the flow is achieved during the rotation. In this connection the circumferentially arranged notch 18 assists in retaining an even flow of the liquid/melt during its motion from the spokes 16 down towards the upper side of the disk 13 to be spread out thereon around the entire axis of rotation.

Thus, the liquid/melt reaches the upper side of the disk 13 around its entire periphery under the notch 18 and inwardly of the deviation notch 21 at a straight part of the space 19 at 22. By means of centrifugal action the liquid/melt is allowed to spread outwardly towards the periphery of the disk and is during this transfer forced to pass the "arresting" notched deviation 21 with its space of equal thickness, a circumferential adjustment in the distribution of material being obtained. After the passage through the circumferential notched deviation in the disk the liquid/melt consists of a layer of even thickness which circumferentially spreads to the periphery of the disk, from which the actual droplets are generated.

According to the invention the liquid/melt is formed into a continuous layer of even thickness by passing the same through the circumferential notched deviation. The function of the notched deviation is to counterbalance the variable distribution of liquid/melt fed to the disk by providing velocity changes of spreading both radially and tangentially. In this way a liquid/melt of even and continuously decreasing film thickness is obtained circumferentially, which is thus forced to be retained on the disk during its radial spreading towards the periphery of the disk without any further control and/or restriction from above.

A layer of even thickness of liquid/melt is thus according to the invention achieved by means of the reduced influence of shear forces, viscosity changes and other dispensing properties in connection with the feeding onto the disk. The layer spreads radially on the rotating disk in contact with the same all the time and with a continuously decreasing thickness out towards its periphery and up to the site where droplets are formed circumferentially.

Preferably, the device for droplet formation is according to the invention constructed with several "stories". Such a construction of a second embodiment is shown in FIG. 2. Also in this embodiment of the invention a device 110 for droplet formation is attached to an axis 111. The device 110 for droplet formation comprises distribution means 112A and 112B as well as a disk 113, the disk 113 first being perpendicularly screwed on the threaded axis 11 and successively the distribution means 112A then being axially threaded on the disk 113 and the distribution means 112B being threaded on the distribution means 112A.

In comparison with the device 10 for droplet formation shown in FIG. 1 the distribution means 12 corresponds to the distribution means 112A. The lower projecting part of this distribution means is, however, extended in such a way that its upper side corresponds to the upper side of the disk 13. A further distribution means 112B is screwed on the upper part of the distribution means 112A. The remaining components of the device 110 for droplet formation correspond to those in FIG. 1, and this embodiment of the invention thus includes for example cavities, spokes, notches, spaces, washers, and edges. Additional "stories" can in the corresponding way be arranged on a device for droplet formation according to the invention.

By the device 10 according to the invention for droplet formation being provided with a distribution means, by which the liquid/melt is supplied to the disk 13, an adjustment of the liquid/melt is achieved circumferentially. At the same time the liquid/melt is enforced a continuous and controlled spreading and change in velocity across the disk.

This velocity can be varied in dependence of the specific application in which the liquid/melt shall be used. The velocity of spreading across the disk can of course be varied by changing the speed of rotation, which normally occurs when the droplet diameter is changed.

The flow of liquid/melt, and thus its velocity of spreading across the disk, can be adjusted by changing the thickness of the washer 20. By this the distance between the distribution means 12 and the disk 13 in the notched deviation 21—and thus the size of the space 19 also—will be changed correspondingly, a throttling of the flow of the liquid/melt being obtained. A distance in the notched deviation of 0.01-10 mm, preferably 0.1-2 mm, has turned out to be suitable for most applications.

Furthermore, the design of the edges 23 has turned out to be of utmost importance in order to achieve a circumferentially continuous even distribution of the liquid/melt by controlling its velocity of spreading across the disk. In this connection the angle α of the edges should be chosen to be between 0 and 60°, preferably between 1 and 5°.

Thus, by adjusting the distance between the distribution means 12 and the disk 13 as well as the angle α the device for droplet formation according to the invention can be adapted to different liquids/melts in such a way that a spreading in all instances results in a film with an evenly decreasing thickness towards the periphery of the disk, droplets of minimal variation in diameter being formed.

The film of the liquid/melt is under controlled conditions transported to a specific site, from which discrete and individual drops (particles) are formed. The velocity of the film across the disk is reduced in comparison with centrifugal techniques according to the state of the art, which work at corresponding angular velocities. By the totally controlled and restricted spreading and change in velocity the liquid/melt can according to the invention be retained on the disk and in contact with the same all the time.

The size of the droplets which can be produced by means of a device for droplet formation according to the invention can be varied within such a large interval as 1-3000 μm. However, the size normally lies within the range of 10-500 μm. A number of experiments with different liquids/melts has shown that a more uniform particle diameter is achieved with a lesser dependence on variations in feeding capacity.

A comparative example is given below, in which particles produced according to WO8807414 are compared with those produced according to the present invention. In this connection several experiments were carried out, in which the agarose particles produced had an expected diameter of 100 μm. The statistical characteristics from these experiments are summarized below in table 1.

TABLE 1

| Characteristics | | WO8807414 | | The present invention | | |
|---|---|---|---|---|---|---|
| Particle diam. | min | 25.08 | 54.36 | 41.60 | 80.31 | 78.55 |
| (μm) | max | 256.16 | 206.18 | 138.80 | 144.08 | 132.28 |
| Median value (μm) | | 169.52 | 130.84 | 114.00 | 100.73 | 98.00 |
| Mean (μm) | | 168.11 | 131.17 | 112.70 | 102.06 | 98.04 |
| Std. dev. (μm) | | 27.85 | 28.43 | 13.50 | 10.90 | 8.66 |

As can be seen in Table 1 from the maximum and minimum particle diameters, the dispersion in particle diameter is much larger when particles are produced according to the state of the art (WO8807414) than when produced according to the present invention. The difference in the method used is also reflected by the significantly smaller standard deviation of the inventive particles.

Similar results were also obtained with 100 μm particles made of agar and cellulose. Thus, data are given which represent statistically significant differences between particles produced according to the state of the art (WO8807414) and those produced according to the present invention.

It is apparent that many modifications and variations of the invention as hereinabove set forth may be made without departing from the spirit and scope thereof. The specific embodiments described are given by way of example only, and the invention is limited only by the terms of the appended claims.

What is claimed is:

1. A method for producing droplets comprising:
   a) continuously producing a coherent layer of a liquid or melt of even thickness by means of a centrifugal action along an entire periphery of a rotating disk (13, 113), wherein the liquid or melt being supplied to the rotating disk (13, 113) around its entire axis of rotation from distribution means (12, 112) and leaving the rotating disk (13, 113) as individual droplets, wherein the distribution means (12, 112) distributing the liquid or melt onto the rotating disk (13, 113) has essentially the same speed and direction of rotation as the rotating disk (13,113), the liquid or melt under the influence of the centrifugal action circumferentially undergoes a spreading and change in velocity across the rotating disk (13, 113) in contact with the same; and
   b) producing a plurality of sizes for the droplets as each droplet leaves the periphery of the rotating disk (13, 113).

2. The method of claim 1, further comprising mechanically stirring the liquid/melt in the distribution means (12, 112).

3. The method of claim 2, wherein an adjustment of the flow is produced by the distribution means (12, 112) at the rotating disk (13, 113).

4. The method of claim 1, wherein an adjustment of the flow is produced in the distribution means (12, 112) at the rotating disk (13, 113).

5. The method of claim 1, wherein the spreading and change in velocity of the liquid/melt across the rotating disk (13, 113) is produced by the liquid or melt being forced to pass an arresting notched deviation 21 between the rotating disk (13, 113) and the distribution means (12, 112).

6. The method of claim 5, wherein the passage through the arresting notched deviation (21) is adjustable.

7. The method of claim 1, wherein the droplets produced have a median diameter between 98 and 114 μm, a mean diameter between 98.04 and 112.7 μm, and a standard deviation between 8.66 and 13.50 μm.

* * * * *